UNITED STATES PATENT OFFICE.

DAVID S. PRATT, OF PITTSBURGH, PENNSYLVANIA.

FUNGICIDE AND INSECTICIDE AND METHOD OF PRODUCING THE SAME.

1,374,951.      Specification of Letters Patent.      Patented Apr. 19, 1921.

No Drawing.      Application filed October 11, 1919. Serial No. 330,130.

*To all whom it may concern:*

Be it known that I, DAVID S. PRATT, a citizen of the United States, residing at Pittsburgh, in the county of Allegheny and State of Pennsylvania, have invented certain new and useful Improvements in Fungicides and Insecticides and Methods of Producing the Same; and I do hereby declare the following to be a full, clear, and exact description of the invention, such as will enable others skilled in the art to which it appertains to make and use the same.

The present invention relates to improvements in the production of fungicides and insecticides and particularly to the production of a dry polysulfid or lime-sulfur composition. Lime-sulfur solution is used extensively as an insecticide and as a fungicide. It has long been recognized that such a solution undergoes decomposition when attempts are made to evaporate to a dry product representing its active ingredients and capable of dissolving in water to regenerate the original lime-sulfur solution. The usual processes of evaporation cause the loss of hydrogen sulfid and the formation of large percentages of water-insoluble material, with the resultant great decrease of active ingredients and fungicidal and insecticidal value. The presence of large particles of insoluble material so formed is further objectionable in that such particles tend to clog the nozzles of any apparatus used in spraying lime-sulfur solution on vegetation.

It has been proposed, as set forth in United States Patent to E. C. Holten, No. 1,254,908, dated January 29th, 1918, to incorporate a certain percentage of cane sugar in the original lime-surfur solution to act as a stabilizer or preservative, thus reducing the above mentioned decomposition. It has been possible in this manner to prepare a dry lime-sulfur composition which may then be pulverized, but which, because of the added material, contains approximately 12.5 per cent. of the stabilizing material possessing no fungicidal or insecticidal activity and therefore inert.

The present invention relates to a process by which a dry lime-sulfur composition may be obtained which may be not only free from these foreign inert ingredients, which heretofore have been considered essential in order to guard against excessive deterioration of the mass, but in addition possesses other valuable and novel properties. This new dry lime-sulfur composition is obtained directly as a uniform, fine grained powder requiring no further pulverizing and containing no large particles capable of clogging the nozzles used in applying the solution resulting from dissolving the powder in the usual volume of water. So also the product consists of individual particles of an approximately spherical configuration. Further, the fineness and uniform freedom from large particles renders the new product more readily soluble in cold water. This is important as users of such a material are generally restricted to water at ordinary temperature in making up their solutions. Moreover, the dry lime-sulfur product obtained according to this invention is superior to dry lime-sulfur-sugar mixtures heretofore manufactured, not only in the above mentioned particulars but also in that it actually contains a poly-sulfid content far in excess of the ordinary composition of such mixtures and a total of active ingredients, which, in a typical analysis amounts to as high as 85% and upward. Moreover, the unavoidable small percentage of insoluble material is in a very finely divided condition that causes little or no trouble to the user, *e. g.*, by clogging the valves and nozzles of the apparatus employed.

If it be desirable for any reason to add a suitable preservative to the original lime-sulfur solution before reducing to the dry condition, such stabilizing material will be homogeneously distributed throughout as an ingredient of the individual particles and in a manner which tends to materially increase the desired function. Such a mixture prepared by the process of this invention is a very superior product as regards stability and fungicidal and insecticidal value compared to any similar products heretofore obtained. A typical product prepared from a lime-sulfur-sugar solution showed on analysis only 9 per cent. insoluble material, mainly sulfur, and 90 per cent. total active fungicidal content including surfur. Similar products heretofore known usually contain only about 70 to 75 per cent. total active ingredients.

In spite of the ease with which lime-sulfur solutions decompose on evaporating to dryness, especially when such evaporation is carried out at ordinary pressures or even at reduced pressures in the absence of any preservative material, it was found possible to prepare a dry substantially undecomposed lime-sulfur composition by the process herein described. The customary 33° Baumé lime-sulfur solution as ordinarily sold to orchardists and containing about 33% of total solids may be used, or if desired the process may be carried out employing solutions of other concentrations. In the practice of this invention, the lime-sulfur solution is atomized, by compressed air, into a warm chamber maintained at ordinary pressures just sufficient to carry off the steam. i. e., a current of air is drawn through the chamber at a rate sufficient to maintain a pressure therein but slightly below that of the atmosphere,—for example, a pressure corresponding to one inch of water below atmospheric pressure. The solids contained in the solution fall to the floor of the chamber as a dry powder requiring no pulverizing or other further treatment, which constitutes the new product.

In the preferred practice of the invention, the temperature of the chamber into which the spray is introduced is maintained at about 250° F. and the air entering the chamber for carrying off the moisture is admitted at about 360° F. and should not ordinarily fall below 215° F. It is found that the size of the particles can be regulated to some extent by varying the density of the solution, varying the construction or adjustment of the sprayer and the conditions of temperature and pressure. In any event, however, the spray must introduce the solution in the condition of a fine mist and the conditions of temperature must be such as to insure the deposition of the solids as a dry powder, the moisture being removed at a sufficiently rapid rate so that it may not interfere with the normal and continuous deposition of the material.

The new lime-sulfur composition of the present invention is composed essentially of the active ingredients calcium poly-sulfids, calcium thio-sulfate and sulfur. Lime-sulfur solutions, such as those from which the product of the present invention is made, contain the first two ingredients enumerated. The last, sulfur, produced during the drying process by a slight decomposition of the other active ingredients, is included among the insoluble material, but it also is properly included among the active ingredients.

A typical composition of the new dry lime-sulfur product of the present invention is given in the following table:

| | |
|---|---|
| Calcium poly-sulfids | 74.96% |
| Calcium thio-sulfate | 5.99 |
| Sulfur | 8.60 |
| Total active ingredients | 89.55 |

Having thus described my invention, what I claim is:

1. The method of producing a dry lime-sulfur composition containing a high percentage of active ingredients and of relatively uniform fineness, which comprises spraying a lime-sulfur solution in the form of a fine mist into a heated chamber and withdrawing the vapor formed from the chamber, the solids of the solution being thereby deposited in a condition of fine subdivision; substantially as described.

2. The method of producing a dry lime-sulfur composition containing a high percentage of active ingredients and of relatively uniform fineness, which comprises spraying a lime-sulfur solution in the form of a fine mist into a heated chamber, passing a heated gaseous medium through the chamber and thereby withdrawing the vapor formed from the chamber, the solids in the solution being thereby deposited in a condition of fine subdivision; substantially as described.

3. A fungicide and insecticide consisting of a dry lime-sulfur composition in the form of particles of practically uniform fineness and of approximately spherical contour requiring no further grinding, containing a high content of active ingredient readily soluble in cold water and a low percentage of insoluble material; substantially as described.

4. A fungicide and insecticide consisting of a dry lime-sulfur composition free from added substances, in the form of particles of practically uniform fineness and of approximately spherical contour, requiring no grinding, containing 80% or over of active fungicidal and insecticidal ingredients readily soluble in cold water and a low percentage of insoluble material also of such uniform fineness as to prevent clogging of spray nozzles when used in the customary way; substantially as described.

In testimony whereof I affix my signature.

DAVID S. PRATT.